June 25, 1968     O. RUBISCH     3,390,013
HIGH-TEMPERATURE RESISTANT STRUCTURAL BODY
Filed March 4, 1965
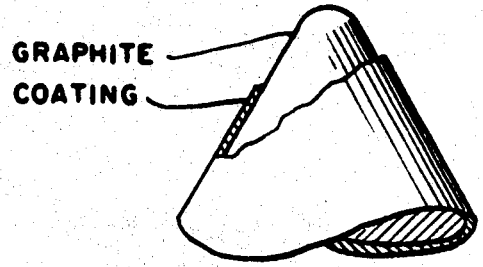
GRAPHITE COATING United States Patent Office 3,390,013
Patented June 25, 1968

3,390,013
HIGH-TEMPERATURE RESISTANT STRUCTURAL BODY
Ottmar Rubisch, Meitingen, near Augsburg, Germany, assignor to Siemens-Planiawerke Aktiengesellschaft für Kohlefabrikate, Meitingen, near Augsburg, Germany, a corporation of Germany
Filed Mar. 4, 1965, Ser. No. 437,051
Claims priority, application Germany, Mar. 6, 1964, S 89,888
13 Claims. (Cl. 117—219)

ABSTRACT OF THE DISCLOSURE

Refractory structures are protected from oxidation by a coating comprising an intimate mixture of an aluminum silicate based glass and an oxygen getter comprising a silicide of a metal from Groups IVb to VIb of the Periodic Table.

---

My invention relates to high-temperature resistant structural bodies, namely those made of molybdenum or of an alloy of molybdenum with one or more elements from the Groups IVa to VIa of the periodic system of elements, or of silicon carbide or carbon. In a more particular aspect, my invention relates to refractory bodies with a dense, scale-resistant coating, and to a method for producing such a coating. Shaped bodies of this type are employed, for example, as electrical heating elements and as refractory structural components.

Refractory bodies of molybdenum, molybdenum alloys, silicon carbide or carbon, however, are susceptible to oxidation at high temperatures. Consequently, if electrical heaters or refractory structures of such materials are used in oxygen-containing atmospheres without a scale-resistant coating, they are prematurely damaged or destroyed.

In shaped bodies of silicon carbide bonded by their own material or by material of the same kind, some of the total volume is occupied by pores resulting from the production method, the share of the pore volume being between 10 and 30%, for example. If such a body is employed as a heating conductor in an oxidizing atmosphere, the oxygen reacts with the silicon carbide and forms crystalline silicon oxide. If the body is subjected to alternating changes in temperature, the crystalline silicon oxide passes through different modifications whose respective densities greatly differ from each other. The silicon oxide precipitated in the pores then causes swelling of the shaped body or leads to the formation of intercrystalline fissures. As a result, the resistance of the heating conductor increases with time during heating operation. This phenomenon, also called aging, reduces the useful lifetime of the heating element.

In a shaped body of graphite or other carbon, the porosity, as a rule, amounts to a share of approximately 10 to 35% of the total volume. Such bodies likewise oxidize in oxygen-containing atmospheres at temperatures above 450 to 550° C.

It is an object of my invention, relating to highly refractory structural bodies of the above-mentioned type, to provide a reliable remedy and to make them suitable for operation in oxygen-containing atmosphere without danger of being damaged.

It is known to silicize refractory bodies of molybdenum or molybdenum alloy, and in some cases to follow the silicon treatment by oxidation, or by enamelling a surface with a glaze containing silicon oxide.

It is also known to use glazes which contain sillimanite or mullite, or which contain the oxides of the metals titanium, aluminum, calcium, hafnium, thorium, beryllium, magnesium, zirconium, chromium, tantalum, niobium, cerium.

It is further known to coat a structural body of silicon carbide with molybdenum silicide, and to fire the coating in an oxidizing atmosphere. This protective coating still possesses a porous structure which exhibits a crystalline texture and hence does not afford effective protection from in-diffused oxygen.

For reducing burn-off, bodies of carbon have heretofore been provided with coatings of silicides and/or carbides. Structural bodies of graphite for use with nuclear reactors have been heretofore provided with coatings of carbon or of carbides of the transition metals.

The results heretofore achieved with the above-mentioned coatings leave much to be desired because these coatings do not sufficiently prevent the ingress of oxygen. This is particularly disagreeable with shaped bodies of graphite employed as envelopes for nuclear fuel elements. The fission products issuing from the nuclear fuel penetrate the insufficiently sealed envelopes and thus may enter into the coolant circulation of the reactor.

It is an object of my invention to provide shaped refractory bodies, for the above-mentioned and various other purposes, with a coating which affords a good and reliable seal at the body surface and is also capable of withstanding alternating temperature stresses while remaining free of fissures, thus preventing the occurrence of damage, such as scaling of the body.

To achieve these objects and in accordance with the invention, the coating applied to highly refractory structural bodies of the above-mentioned type is formed of a base substance with an embedded getter substance. The base substance is composed of 70 to 85% silicon oxide, 14 to 29% aluminum oxide, 0.9 to 6% earth alkali oxide, and 0.1 to 5.0% alkali oxide, all percentages being by weight. The getter substance is finely distributed throughout the base substance and is formed substantially of one or more metal silicides, the metals being from the Groups IVa to VIa of the periodic system of elements, these metals being particularly titanium, zirconium, hafnium, thorium, vanadium, niobium, tantalum, chromium, molybdenum and tungsten. The getter substance finely distributed in the base substance directly improves the density and hence the sealing effect of the coating. In addition, the embedded substance has the advantageous effect of bonding any oxygen as may still diffuse into the coating, this being due to the gettering property of the substance.

For example, with a highly refractory body of molybdenum and the getter substance in the coating consisting of molybdenum silicide, the occurrence of oxygen diffusing into the coating causes a reaction in accordance with the following equation:

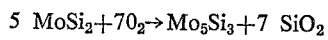

or

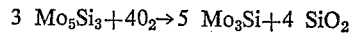

In both cases, therefore, only the solid oxidation products having very high melting points are formed. These oxides prevent scaling of the molybdenum body, thereby also protecting the coating from being forced off the body.

It has been found preferable to provide an amount of 10 to 80% getter substance, preferably 30 to 70% within the base substance of the coating, since the share of getter substance is essential to bonding in-diffused oxygen. For this reason, too, a silicide powder of finest feasible granulation should be employed, such as in a grain-size below 25 micron, preferably below 15 micron. A decrease in granular size increases the active surface of the getter substance relative to oxygen diffusing into the coating.

It has been found that a refractory body of the abovementioned kind, if provided with a coating according to the invention, will withstand up to 300 alternating temperature stresses between 20 and 1500° C. without the coat scaling off and without burn-off damage. This has been established by tests made preferably with round rods and plates. Long-time annealing tests with wires of 3 mm. diameter at 1600° C. in oxygen have shown a lifetime of several 1000 hours. Comparative tests with rods having a coating of the known type consisting of oxides, and with otherwise the same rods but provided with coatings according to the invention, have shown a lifetime ratio of approximately 1:10.

The adherence of the coatings according to the invention is considerably improved if the share of the aluminum oxide in the base substance of the coating is partially substituted by the oxides of the above-mentioned alloying partners of the refractory body, namely by oxides of the above-mentioned metals from Groups IV$b$ to VI$b$ of the periodic system. This has been found to apply, for example, to refractory bodies of molybdenum alloys with titanium and/or zirconium and/or niobium and/or tantalum and/or thorium. If some of the aluminum oxide in the base substance of the coating is substituted by one or more oxides of the metal with which the molybdenum is alloyed in the fundamental body, the bonding between the coating and the body is greatly strengthened. It is of advantage to thus substitute up to 60% of the aluminum-oxide share by these other metal oxides.

Various methods are available for providing the above-mentioned refractory bodies with coatings according to the invention. According to one of these methods, the constituents of the coating to be formed are prepared in form of an aqueous suspension to which an organic bonding medium may be added. The suspension is applied to the surface of the refractory body. This is done by immersing the body in the aqueous suspension, by spraying the suspension upon the body surface, or by brushing the suspension onto the body. Thereafter the coating is fired at temperatures of 1200 to 1400° C. in a reducing or inert atmosphere.

Another method is as follows. The constituents of the coating to be formed, comprising those of the base substance and those of the getter substance, are first fired to form a frit. The brittle frit is then pulverized. The refractory body is heated to a surface temperature of about 400 to 1000° C., and the pulverized material is flame-sprayed upon the heated surface.

Applicable as oxide mixtures are natural silicic-acid compounds such as kaolin, feldspar, mica, beryl, zircon, monazite, bentonite and similar compounds. It has been found useful to add fluoride-containing fluxing agents in a quantity of 0.1 to 5% to the base substance.

During firing treatment, the mass deposited upon the refractory body forms a glaze which results in a gas-tight coating in which the silicides are suspended.

It has been discovered that, when processing shaped bodies of graphite or other carbon, the adhesion of the coating according to the invention is further improved by first covering the surface of the bodies with a very thin layer of silicon carbide and/or a silicide and/or a carbide of one or more elements from Groups IV$b$ to VI$b$ of the periodic system, this first layer being directly deposited upon the carbon body. Thereafter, the vitreous coating with the metal silicide suspended therein to serve as a getter, is deposited upon the first layer and further treated in the manner described above.

The adhesion of the coating has been found to be particularly good if the surface tension of its oxidic share amounts to 300 to 360 dyn./cm. at 1400° C. Coatings having a higher or lower surface tension tend to form fissures, or the fused glaze may tend to scale off.

With structural bodies of graphite or other carbon particularly those for use with nuclear reactors, it is of advantage to add to the base substance of the coating essentially the oxides of beryllium and/or calcium and/or zirconium and/or niobium, aside from silicon oxide and aluminum oxide. Particularly suitable as getter substances are the silicides of titanium, zirconium and niobium. Care should be taken that the coatings, which reduce the permeability, possess very slightly absorption cross sections for neutrons.

Example 1

This example deals with improving the scale-resistance of molybdenum electrodes for glass melts. The molybdenum bodies are immersed in an aqueous suspension whose solid contents is composed of 50% molybdenum silicide powder (60% Mo+40% Si) having a grain size $<25\mu$, and 50% of a mixture containing 70% $SiO_2$+25% $Al_2O_3$+5% $CaF_2$.

The coating is dried in air at 105° C. Then the bodies are passed through a furnace at 1500° C. in $H_2$ (dewpoint 20° C.). After the bodies have cooled to room temperature, they exhibit an enamel-like coating of 30 to 35$\mu$ thickness which adheres very well to the metal body and is free of fissures. After heating the body in free air to 1500° C. for 20 hours, no fuming off of molybdenum trioxide was observed. This length of time suffices to cause melting of mixtures for the production of glass, without attack upon the electrodes.

Example 2

A molybdenum crucible is to be protected from oxidation at high temperatures. This is done as follows. The molybdenum crucible is provided with a coating of 90% molybdenum silicide (50% Mo+50% Si) and 10% of an oxide mixture (50% kaolin+45% calcium fieldspar+5% $CaF_2$). The body is dried at 200° C. Thereafter it is shoved into a sintering oven and sintered at 1650° C. in an $H_2$ atmosphere (dewpoint 10° C.). After a dwell time of 10 minutes, the crucible is taken out into the open air and then cools in air without $MoO_3$ smoke formation. For improving the protection from oxidation, the crucible is again provided with a coating according to Example 1. Crucibles thus made have been annealed with oxide mixtures at 1300° C. in a Silit-furnace in air for more than 3000 hours without loss in weight. No corrosion has been observed.

Example 3

A rocket nose cone of graphite, such as the one schematically shown on the accompanying drawing, was immersed into an aqueous suspension of $TiSi_2$, dried at a temperature of 120° C., and subsequently heated for a short interval of time in a high-frequency furnace at 1600° C. After a dwell time of 10 minutes, the furnace was switched off, the nose cone permitted to cool in the furnace, and then taken out. The nose cone was then immersed into an aqueous suspension consisting of a mixture of 50% $MoSi_2$ and 50% composed of $SiO_2$ (70%) and $Al_2O_3$ (23%), $Na_2O+K_2O$ (2%), and CaO (5%). Thereafter the body was again dried at 120° C. and then heated in a hydrogen atmosphere at 1400° C. for ten minutes. In this manner, the body was given a first layer of titanium silico-carbide and a coating consisting of the cermet Al-silicate-glass-$MoSi_2$.

Graphite bodies thus treated exhibit no burn-off when heated to temperatures between 600 and 1000° C. in an oxidizing atmosphere for 1000 hours. At temperatures of 1100° C. up to about 1200° C. the lifetime is about 10 times as long as with untreated graphite bodies. At higher temperatures up to about 1650° C., the lifetime of the treated graphite bodies is still 2 to 4 times as long as that of the untreated bodies.

Example 4

A SiC three-phase element for electric heating purposes is to be protected from oxidation. For this purpose an aqueous suspension is prepared from 70% Al-silicate-glass having the composition 73% $SiO_2$, 21% $Al_2O_3$, 2%

$ZrO_2$, 2% $Na_2O+K_2O$ and 2% $CaO+MgO$; and 30% $MoSi_2$ having a grain size $<15\mu$. Added to the aqueous suspension is methyl cellulose in 1% concentration to serve as a suspension agent.

The heating conductor to be protected is immersed into the suspension and dried at 120° C. Then the heater rod is shoved through a tunnel furnace at a maximal temperature of 1400° C. During the passage the suspension is fired and converted to a vitreous coating. It adheres very firmly to the SiC body even when subjected to alternating temperature stress and, during continuous operation, exhibits a lifetime 4 times as long as that of the untreated SiC heater element.

To those skilled in the art, it will be apparent from the foregoing disclosure that my invention permits of various modifications with respect to individual constituents, their percentages, and the particular refractory bodies to which the getter-containing coatings are applied, and hence may be given embodiments other than particularly described herein, without departing from the essential features of my invention and within the scope of the claims annexed hereto.

I claim:

1. In a shaped and coated refractory body formed of substance selected from the group consisting of molybdenum, refractory alloys of molybdenum with at least one element from Groups IV$b$ to VI$b$ of the periodic system, silicon carbide and carbon, the coating of said body comprising a base substance and a getter substance, said base substance being formed of 70 to 85% by weight of silicon oxide, 14 to 29% aluminum oxide, 0.9 to 6% earth alkali oxide, and 0.1 to 5% alkali oxide, said getter substance being finely distributed throughout said base substance and consisting of silicide of at least one metal from the Groups IV$a$ to VI$a$ of the periodic system.

2. In a shaped and coated refractory body formed of substance selected from the group consisting of molybdenum, refractory alloys of molybdenum, silicon carbide and carbon, the coating of said body comprising a base substance and a getter substance, said base substance being formed of 70 to 85% by weight of silicon oxide, 14 to 29% aluminum oxide, 0.9 to 6% earth alkali oxide, and 0.1 to 5% alkali oxide, said getter substance being finely distributed throughout said base substance and consisting of silicide of at least one metal from the group consisting of Ti, Zr, Hf, Th, V, Nb, Ta, Cr and W, and said getter substance amounting to 10% to 80% by weight of said base substance and having a grain size below 25 micron.

3. In a coated refractory body according to claim 2, said getter substance amounting to 30 to 70% of said base substance and having a grain size below 15 micron.

4. In a shaped and coated refractory body formed of substance selected from the group consisting of molybdenum, refractory alloys of molybdenum, silicon carbide and carbon, the coating of said body comprising a base substance and a getter substance, said base substance being formed of 70 to 85% by weight of silicon oxide, 0.9 to 6% earth alkali oxide, 0.1 to 5% alkali oxide, and the sum of 14 to 29% of aluminum oxide plus at least one further oxide of metal from the group consisting of titanium, zirconium, niobium, tantalum and thorium, with said further oxide amounting up to 60% by weight of the aluminum oxide, said getter substance being finely distributed throughout said base substance and consisting of silicide of at least one metal from the group consisting of Ti, Zr, Hf, Th, V, Nb, Ta, Cr, Mo and W.

5. A shaped and coated refractory body of graphite having a coating consisting essentially of a base substance and a getter substance, said base substance comprising 70 to 85% by weight of silicon oxide, 14 to 29% aluminum oxide, the remainder being substantially formed of oxide of at least one metal from the group consisting of beryllium, calcium, zircon and niobium, and said getter substance being finely distributed in said base substance and consisting of silicide of at least one metal from the group consisting of Ti, Zr, Hf, Th, V, Nb, Ta, Cr, Mo and W, the amount of said getter substance being 10 to 80% by weight of said base substance.

6. A coated refractory body according to claim 2, comprising an intermediate layer beneath said coating, said intermediate layer having substantially the same composition as said coating except that the amount of said getter substance in said intermediate layer amounts to 90 to 99% by weight of said layer.

7. A coated refractory body according to claim 5, comprising a base layer of silicon carbide directly upon the graphite and beneath said coating.

8. A coated refractory body according to claim 5, comprising a base layer directly upon the graphite and beneath said coating, said base layer consisting of silicide of at least one element from the IV$b$ to VI$b$ groups of the periodic system.

9. A coated refractory body according to claim 5, comprising a base layer directly upon the graphite and beneath said coating, said base layer consisting of carbide of at least one element from the IV$a$ to VI$b$ groups of the periodic system.

10. In a coated refractory body according to claim 1, the oxidic share in said base substance having a surface tension of about 300 to 360 dyn./cm. at a temperature of 1400° C.

11. The method of coating a refractory body formed of substance selected from the group consisting of molybdenum, refractory alloys of molybdenum, silicon carbide and carbon, which comprises the steps of preparing an aqueous suspension of a base substance and a getter substance, said base substance containing 70 to 85% by weight of silicon oxide, 14 to 29% aluminum oxide, 0.9 to 6% earth alkali oxide and 0.1 to 5% alkali oxide, said getter substance amounting to 10 to 80% of the base substance and being formed substantially of silicide of at least one metal from the group consisting of Ti, Zr, Hf, Th, V, Nb, Ta, Cr, Mo and W; applying said suspension to the surface of the refractory body; and firing the suspension on said body in a reducing atmosphere at temperatures from 1200 to 1400° C.

12. The method of coating a refractory body according to claim 11, which comprises adding an organic bonding medium to the aqueous suspension prior to applying the suspension to the body.

13. The method of coating a refractory body formed of substance selected from the group consisting of molybdenum, refractory alloys of molybdenum, silicon carbide and carbon, which comprises the steps of preparing a coating composition of a base substance and a getter substance, said base substance containing 70 to 85% by weight of silicon oxide, 14 to 29% aluminum oxide, 0.9 to 6% earth alkali oxide and 0.1 to 5% alkali oxide, said getter substance amounting to 10 to 80% of the base substance and being formed substantially of silicide of at least one metal from the group consisting of Ti, Zr, Hf, Th, V, Nb, Ta, Cr, Mo and W; firing the composition to a frit; pulverizing the frit; heating the refractory body to a surface temperature of about 400 to 1000° C.; and flame-spraying the pulverized composition upon the heated surface to form the coating.

References Cited

UNITED STATES PATENTS

| | | | |
|---|---|---|---|
| 2,650,903 | 9/1953 | Garrison et al. | 117—129 X |
| 2,993,814 | 7/1961 | Epprecht et al. | 117—228 X |
| 3,252,827 | 5/1966 | Rose et al. | 117—135.1 X |
| 3,269,856 | 8/1966 | Jones | 117—129 X |

RALPH S. KENDALL, *Primary Examiner.*

A. L. LEAVITT, *Examiner.*

J. H. NEWSOME, *Assistant Examiner.*